Figure 1:
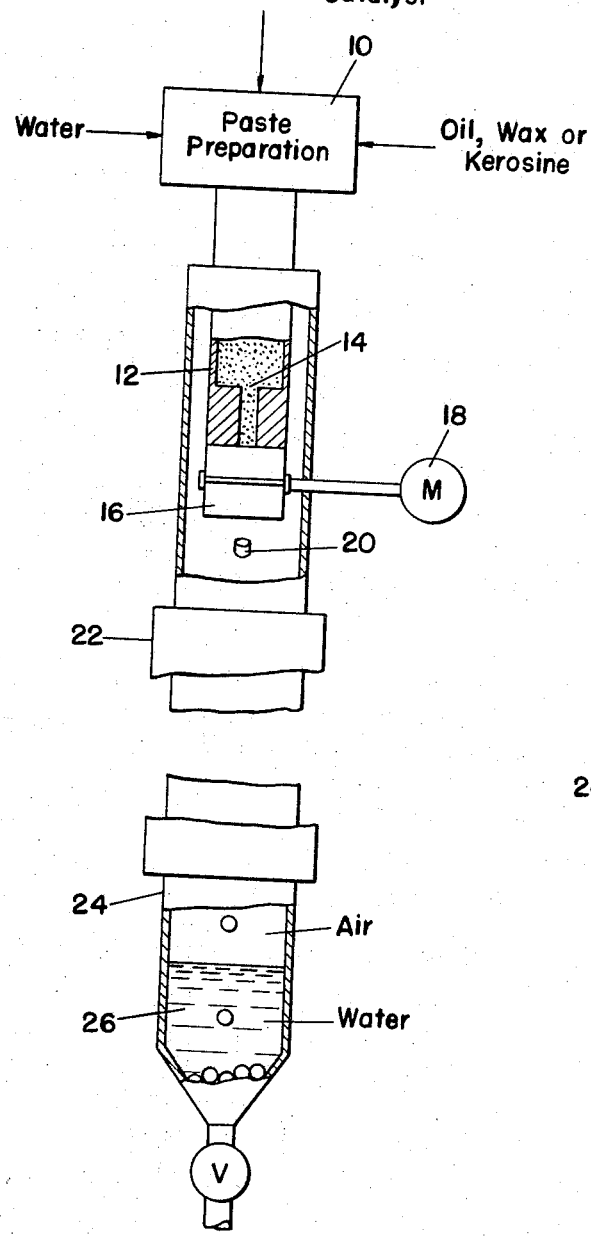

INVENTOR
ROLLAND G. BOWERS

BY Robert O. Spindle
ATTORNEY

United States Patent Office 3,350,482
Patented Oct. 31, 1967

3,350,482
METHOD OF PRODUCING SPHERICAL SOLIDS
Rolland G. Bowers, Toledo, Ohio, assignor to Sun Oil Company, Philadelphia, Pa., a corporation of New Jersey
Filed Apr. 18, 1962, Ser. No. 186,863
15 Claims. (Cl. 264—13)

This application is a continuation-in-part of application Serial No. 717,816 filed Feb. 27, 1958, by the present inventor.

This invention relates to production of granular solids, and more particularly to a novel manner of preparing solids catalysts, adsorbents, etc. having approximately spherical shape.

Many industrial processes involve the use of solid catalysts, adsorbents, etc. in the form of particles having size for example within the approximate range from 1/16 inch to 1/2 inch. Such solids frequently comprise a siliceous material, e.g. a clay or other naturally occurring silicious material, or synthetic silicious materials such as gels.

Solid catalysts and adsorbents have been prepared in approximately spherical shape by a process in which a hydrosol is passed downwardly in droplet form through a liquid medium, e.g. mineral oil, which is immiscible with the hydrosol, the latter gelling to form spherical hydrogel particles during passage through the liquid medium. A disadvantage of such processes resides in the fact that it is difficult to obtain spherical particles having uniform particle size. Variation in the size of the droplets, and varying extents of shrinkage are factors contributing to non-uniformity in the product.

Solid particles having uniform particle size can be prepared by extrusion of a paste in water or other suitable medium. However the particles which are produced by cutting extruded solid material have a disadvantage, as compared with spherical particles, in that they are more subject to attrition when used in moving bed processes and do not pack as well in a bed when employed in stationary bed processes.

The present invention provides a novel manner of producing solid particles wherein the particles obtained are more nearly spherical than those produced in conventional extrusion processes, and more uniform with respect to size than those produced in conventional gelation processes. This is accomplished by first preparing cylindrical or other extruded particles in conventional manner, and then subjecting the extruded and cut particles to an operation in which they are passed through a fluid, i.e. liquid or gaseous or vaporous, medium and are converted into a more nearly spherical shape as a result of the resistance of the medium to such passage.

The passage of the extruded particles through the fluid medium is performed while the solid is still in a plastic condition, so that it is capable of being shaped during the passage, which is preferably performed directly after the cutting of the extruded solid into individual particles.

The amount of liquid material in the extruded particles is sufficient to provide plasticity, but excessive amounts of liquid are avoided in order that the particles will be sufficiently cohesive not to disintegrate during passage through the medium. The amounts of liquid to provide these results vary acording to the nature of the liquid and of the solid material in the extruded particles. In the light of the present specification, a person skilled in the art can determine the proper amount of liquid in a given case. Usually the amount of liquid will be within the approximate range from 40 to 90 weight percent, based on the total solid-liquid composite, though other amounts may be used in some instances.

In one embodiment of the invention, the extruded particles are dropped through a gaseous or vaporous medium, which may be air, though other suitable media such as flue gases, nitrogen, etc., which may readily be selected by a person skiled in the art, can also be employed. The particles are dropped through a sufficient distance, e.g. 10 to 100 feet or more, to bring about the desired shaping of the particles. The particles can be collected in a body of liquid, e.g. water, mineral oil, etc. at the lower end of the fluid column.

In another embodiment, the fluid medium employed is a liquid. The liquid employed should be one which is inert to the catalyst particles. In one embodiment, the liquid has lesser density than that of the solid particles. Any liquid which answers these qualifications is suitable for use according to the invention, and a person skilled in the art can select a suitable liquid in the light of the present specification. Water is frequently a convenient liquid to employ. In cases where organic liquids are desired, or liquids which are immiscible with water, hydrocarbons such as mineral oil fractions are advantageously employed. The viscosity of the fluid medium employed preferably does not exceed 500 Saybolt Universal seconds at the temperature involved in the process. Any suitable lower viscosity can be employed. In still another embodiment, the fluid medium is a liquid having density greater than that of the solid particles, and the latter rise through the fluid medium and are skimmed from the upper surface of the medium.

In the process according to the invention, the solid particles are passed through the fluid medium in any suitable direction, though it is preferred that the direction be approximately vertical, and further preferred that the direction be downward.

It is not essential that the fluid medium through which the solid particles pass be stationary. The fluid medium can be moving also, in any desired direction with respect to the direction of movement of the solid particles.

The extrusion operation which is performed prior to passage through the fluid medium can be performed according to any known procedure for production of extruded solid material. Such processes are generally well known in the art. They usually involve preparing a paste of solid granules in a liquid medium, frequently water, adjusting the liquid content of the paste to the proper value to impart plasticity to the paste, and forcing the paste through an orifice to form the extruded catalyst. Various extruding machines are known in the art, e.g. the hydraulic plunger type extruder or the continuous auger type extruder. The technique of cutting the extruded solid to the desired lengths is also well known in the art.

Both the extrusion operation and the operation of passage downwardly through a liquid medium requires a certain amount of plasticity in the composition. Generally, the minimum plasticity required for the latter operation is greater than the minimum plasticity required for the extrusion operation, so that it is necessary to employ more liquid in the catalyst composition than would be required for the extrusion operation alone. In the light of the present specification, a person skilled in the art can select a proper amount of liquid for use in a given instance.

In one embodiment, the paste which is extruded contains an added material having relatively low viscosity at high temperatures and relatively high viscosity at low temperatures. The passage through the fluid medium of the extruded particles containing this added material is performed at a relatively high temperature, e.g. 150 to 400° F., at which the added material has relatively low viscosity, and preferably has a viscosity at least 25 Saybolt Universal seconds lower than that which it exhibits at the extrusion temperature, the latter viscosity preferably being in the range from 50 to 250 Saybolt Universal seconds. The presence of the added material at low viscosity renders the composition more plastic than it otherwise would be, and contributes beneficially to the shaping of the particles as they pass through the fluid medium. The temperature during such passage is preferably higher than the temperature at which the extrusion was performed, e.g. at least 25° F. higher than the latter temperature. At the relatively low temperature in the extrusion operation, the viscosity of the added material is greater and the plasticity of the composition less. Following the passage through the fluid medium, the particles are reduced in temperature, e.g. by collection in a body of water, and the reduction in temperature results in raising the viscosity of the added material and decreasing the plasticity of the particles. In this way, the increased plasticity in the composition is confined primarily to the operation, i.e. passage through the fluid medium, in which it is beneficial.

In this embodiment, any material which undergoes a relatively large decrease in viscosity upon heating to elevated temperatures can be employed. An example of such material is a wax or other normally solid material which is capable of being liquefied at moderately elevated temperatures. Another example is mineral lubricating oil, preferably one which has relatively high viscosity at low temperatures and undergoes a large decrease in viscosity upon heating.

The process according to the invention involves in part the incorporation in solid particles of a liquid material which imparts plasticity to the particle. It may be necessary during or following the shaping operation according to the invention to remove excess liquid from the particles. This can be done in the case of water by conventional drying or calcining operations. In the case of organic liquids, the excess can be removed by volatilization, in the case of a sufficiently volatile liquid, or by combustion in the case of a combustible liquid, by heating and draining, by extraction with a suitable solvent such as naphtha or with an aqueous surfactant solution, etc.

The process according to the invention is capable of providing particles having improved uniformity of major dimension. The cylindrical or other extruded particles can be produced with a relatively uniform weight of catalyst in each particle, and the weight of the particles is substantially unchanged as a result of passage through the liquid medium. The latter passage also does not appreciably change the volume of the particles, the effect being primarily to redistribute the volume into a more nearly spherical shape by elimination of the terminal sharp edges characterizing the original cylindrical or other particle. Generally, the particles which are prepared according to the invention have diameter within the approximate range from 1/16 inch to 1/4 inch.

The invention is generally applicable to solid materials which are susceptible of preparation by the paste extrusion technique. Compositions for use as catalysts, adsorbents, foods, desiccants or other uses can be treated according to the invention. The invention is particularly beneficial as applied to the siliceous catalysts and adsorbents, which in some instances contain various metals, metal oxides, metal sulfides, etc. adapted to provide various catalytic effects for use in processes such as hydrogenation, reforming, cracking, polymerization of olefins to liquid or solid polymers, etc. Silica gel, silica-alumina composites, activated clays, fuller's earth, bauxite, activated carbon and cellulose are examples of siliceous and other materials which may advantageously be used.

The temperatures employed during the shaping by passage through the fluid medium can be any suitable temperature which is not so high as to excessively volatilize the liquid in the catalyst particles. It is within the scope of the invention to volatilize or otherwise remove the liquid to any desired extent during a later stage of the passage through the fluid medium, so long as there is sufficient liquid during at least part of the passage to permit the shaping of the particles. The particles can be subjected to different temperatures at different stages of the passage, if desired, to produce different effects, such as shaping, drying, calcining, hardening, etc. Room temperatures can be employed if desired, or elevated temperatures including those disclosed previously.

In one embodiment of the invention, the extruded particles prior to passage through the liquid medium are heated to increase their plasticity. Such heating is frequently advantageous in that a relatively low plasticity is desired in the extrusion operation in order to obtain the most satisfactory results, whereas a higher plasticity is desirable in the operation of passage through the fluid medium. Any suitable means of heating the extruded medium. Any suitable means of heating the extruded particles can be employed. Thus, for example, the heating operation may be performed concurrently with the passage through the fluid medium, the latter being at an elevated temperature in such case and transferring heat to the particles during the passage of the latter therethrough. Such operation may be advantageous for example in the use of a liquid medium, where the period of time during which the particles are in contact with the liquid medium is sufficient to provide substantial heat. In some instances, it may be necessary or desirable to heat the particles prior to introduction into the fluid medium. This can be accomplished in any suitable manner, for example by passing the particles on a belt conveyor through a zone maintained at elevated temperature.

The period of time during which the solid particles pass through the fluid medium depends on a plurality of factors including the densities of the fluid medium and of the solid particles, the viscosity of the fluid medium, and its rate of flow if it is in motion, and the size and shape of the particles. In cases where the fluid medium is a gas or vapor, a fraction of a second may be a sufficient period to obtain the desired shaping of the particles. In the case of liquid medium greater periods are generally involved, for example in the range from 1 to 60 minutes, although periods outside that range are within the scope of the invention. The residence time may be adjusted by flowing the fluid medium upwardly countercurrent to the falling particles, at a rate such that the speed of descent of the particles is suitably reduced. In this manner, the extent of heating and drying of the particles by the fluid medium, in a case where the latter is at elevated temperature, for example where hot flue gas is the fluid medium, may be suitably regulated.

Figure 2:
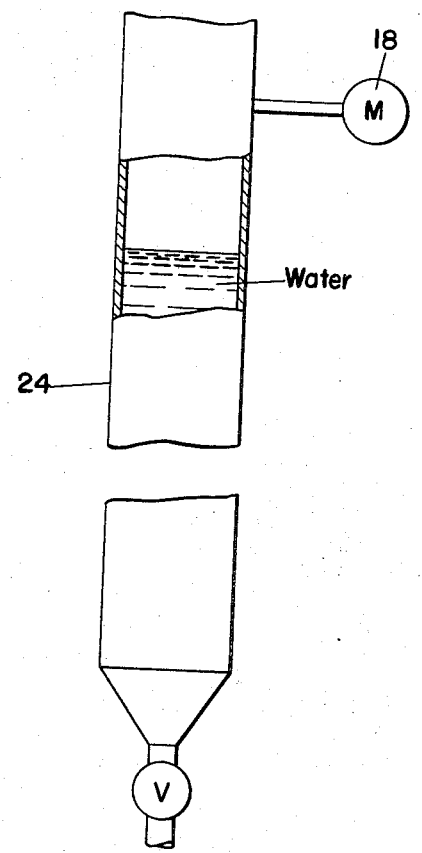

The invention will be further described with reference to the following examples, which contain a description of the drawing, wherein FIGURE 1 is a schematic diagram illustrating one embodiment of the process according to the invention, and wherein FIGURE 2 schematically illustrates another embodiment.

*Example 1*

A paste is prepared in zone 10 of FIGURE 1, this paste containing 40% by weight of conventional synthetic silica-alumina solid catalyst granules, 50% water and 10% mineral lubricating oil. The paste is extruded through a hydraulic extruder 12, having suitable impelling means not shown, and having a die with 1/4 inch diameter openings such as that indicated at 14. The extrusion is performed at 70° F., at which temperature the lubricating oil in the paste has Saybolt Universal viscosity of about 150 seconds. The extruded catalyst is cut into 1/4 inch lengths by means of rotary knife 16 which is rotated by means of motor 18. The cylindrical particles 20 are then heated to 150° F. by passage through a portion of tower 24 which is surrounded by heating jacket 22, at which temperature the oil is beneath its flash point and has Saybolt Universal viscosity of about 100 seconds. The heated particles are dropped in free fall through a column of air 50 feet high at atmospheric pressure and 150° F. The particles are collected in a body of water 26 at the bottom of the air column. They are subsequently separated from the water and air-dried at 90° F., then heated to 1400° F. for 10 hours.

The resulting particles are approximately spherical and have substantially uniform size. The edges of the terminal planes characterizing the cylindrical particle are removed by re-shaping of the particles during the passage through the air column. Consequently, the catalyst is less subject to attrition during use in conventional moving bed catalyst cracking of petroleum hydrocarbons.

*Example II*

Operation similar to that in Example I is performed using paraffin wax having melting point of 130° F. in place of mineral oil. The heating to 150° F. melts the wax, thereby increasing the plasticity of the extruded catalyst particle. The operation is otherwise similar to that in Example I.

*Example III*

Operation generally similar to that in Example I is performed, the paste being prepared, however, by admixing 50% by weight of catalyst particles with 50% of kerosine. The operation is illustrated in FIGURE 2 of the drawing, which shows only that part of the system which is modified from FIGURE 1. The modification involves substitution of a water column for the air column through which the particles fall in FIGURE 1, and also elimination of the heating jacket shown in FIGURE 1. The extruded particles are passed downwardly through a body of water 10 feet high at ordinary room temperature. Following this operation the particles are air-dried and then heated to remove the kerosine by volatilization, and then heated to 1400° F. for 10 hours. The resulting particles are generally similar to those obtained in Example I.

*Example IV*

Operation generally similar to that in Example I is performed, the paste being prepared however by admixing 50 parts by weight of water with 50 parts of catalyst particles. The extruded particles are passed downwardly through a body of mineral oil 10 feet high at ordinary room temperature. The mineral oil employed is a lubricating oil distillate having Saybolt Universal viscosity of 100 seconds at 100° F. The particles are separated from the oil, and the oil film on the particles is burned off, after which the particles are heated to 1400° F. for 10 hours. The resulting particles are generally similar to those obtained in Example I.

Operation as described in the above examples can be applied to other types of extruded particles, such as those mentioned previously, with generally similar results.

The invention claimed is:

1. Process for preparing solid catalyst particles which comprises: extruding plastic material comprising a mixture of solid granules of siliceous adsorbent material and a liquid material in amount of 40 to 90 weight percent based on total solid-liquid composite; cutting the extruded material into particles having substantially uniform length; passing the particles through a fluid medium thereby to convert them to more nearly spherical shape; and removing excess liquid from the particles to obtain discrete, self-sustaining particles with a minimum of shrinkage.

2. Process according to claim 1 wherein said medium is gaseous.

3. Process according to claim 1 wherein said medium is liquid.

4. Process according to claim 1 wherein said liquid material comprises water and hydrocarbon oil, and said medium is air.

5. Process according to claim 1 wherein said liquid material comprises kerosine, and said medium is water.

6. Process according to claim 1 wherein said liquid material comprises water, and said medium is hydrocarbon oil.

7. Process according to claim 1 wherein said extruded particles are cylindrical in shape prior to passing through said fluid medium.

8. Process according to claim 1 wherein said granules comprise synthetic silica-alumina cracking catalyst.

9. Process according to claim 1 wherein said particles are within the range from 1/16 inch to 1/4 inch particles.

10. Process according to claim 1 wherein said particles fall through a distance in the range from 10 to 100 feet, during said passing.

11. Process according to claim 1 wherein said liquid material has Saybolt Universal viscosity during said extruding within the range of 50 to 250 seconds, and wherein said particles are heated subsequent to said extruding, to reduce the Saybolt Universal viscosity by at least 25 seconds.

12. Process for preparing solid catalyst particles which comprises: extruding plastic material comprising a mixture of solid granules of siliceous adsorbent material and an added solid material in amount of 40 to 90 weight percent based on the total mixture; cutting the extruded material into particles having substantially uniform length; heating the particles to melt said added solid material; passing the particles through a fluid medium, thereby to convert them to more nearly spherical shape; and removing excess added solid material from the particles to obtain discrete, self-sustaining particles with a minimum of shrinkage.

13. Process according to claim 12 wherein said added solid material comprises wax, and said medium is air.

14. Process for preparing solid catalyst particles which comprises: extruding plastic material comprising a mixture of solid granules of siliceous adsorbent material and an added material selected from the group consisting of water and hydrocarbons in amount of 40 to 90 weight percent based on total mixture; cutting the extruded material into particles having substantially uniform length; passing the particles through a fluid medium, thereby to convert them to more nearly spherical shape; and removing excess added material from the particles to obtain discrete, self-sustaining particles with a minimum of shrinkage.

15. Process for preparing solid catalyst particles which comprise: extruding plastic material comprising a mixture of solid granules of siliceous adsorbent material and a liquid material in amount of 40 to 90 weight percent based on total solid-liquid composite; cutting the extruded material into particles having substantially uniform length; passing the particles through an air medium thereby to convert them to more nearly spherical shape; and removing excess liquid from the particles to obtain discrete, self-sustaining particles with a minimum of shrinkage.

References Cited

UNITED STATES PATENTS

| | | | |
|---|---|---|---|
| 2,566,117 | 8/1951 | Christie | 264—15 |
| 2,736,713 | 2/1956 | Murray | 252—448 |
| 2,740,705 | 4/1956 | O'Neill, et al. | 264—15 XR |
| 2,847,710 | 8/1958 | Pitzer | 264—109 |

ROBERT F. WHITE, *Primary Examiner.*

ALEXANDER H. BRODMERKEL, *Examiner.*

M. H. ROSEN, J. A. FINLAYSON,
*Assistant Examiners.*